Nov. 9, 1954  W. DRUTT  2,693,833
NUT BLANCHING MACHINE
Filed June 28, 1950  4 Sheets-Sheet 2
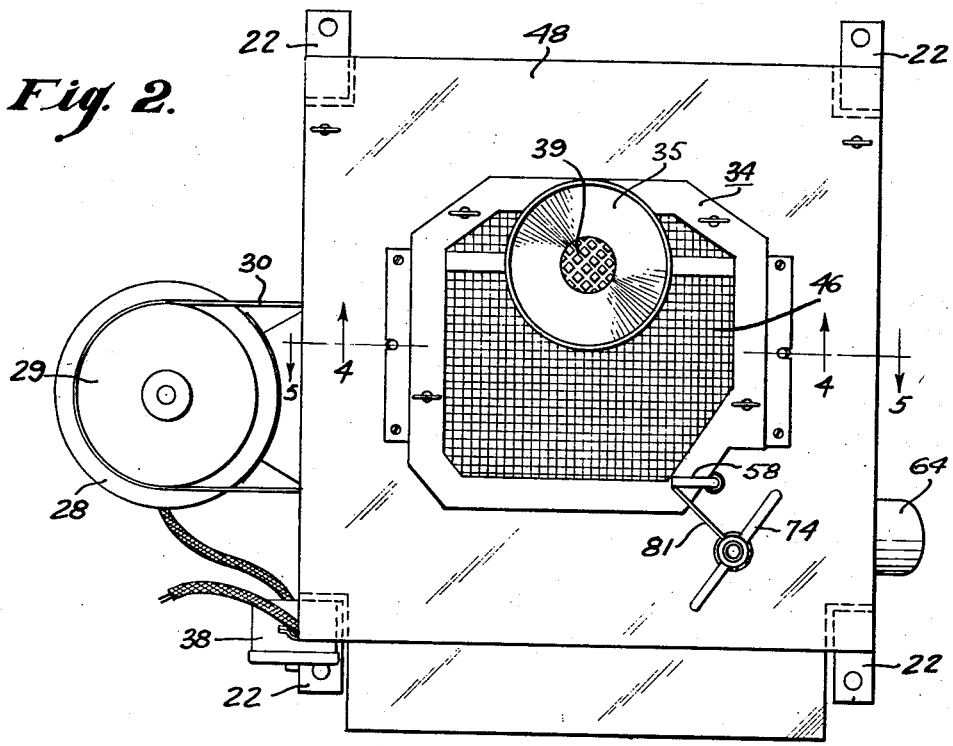
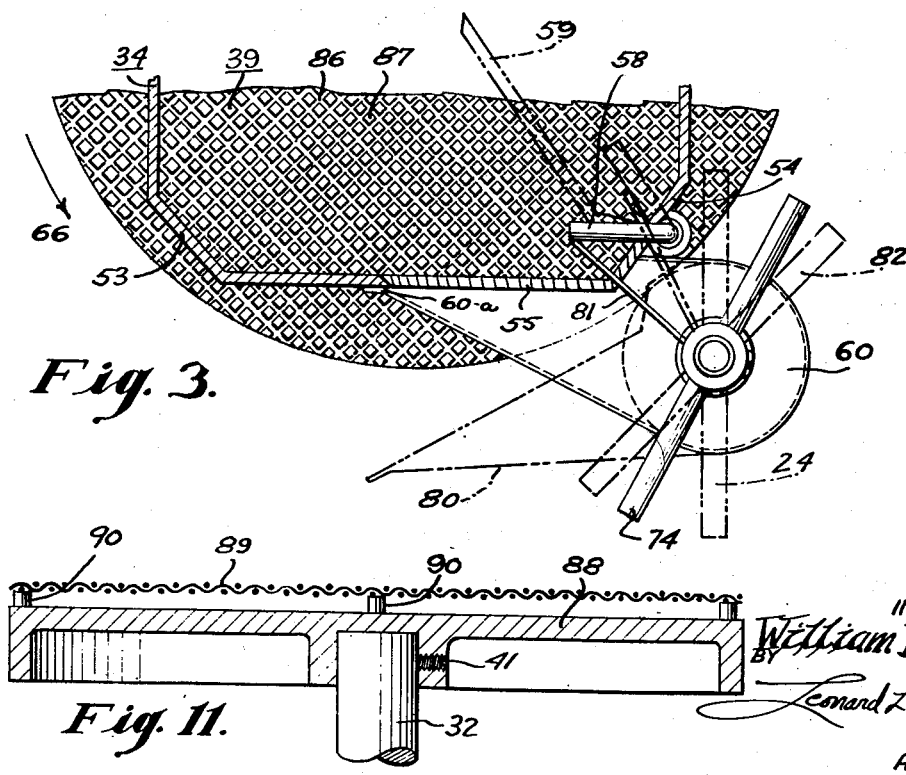
INVENTOR.
William Drutt
BY
Leonard L. Kalish
ATTORNEY.

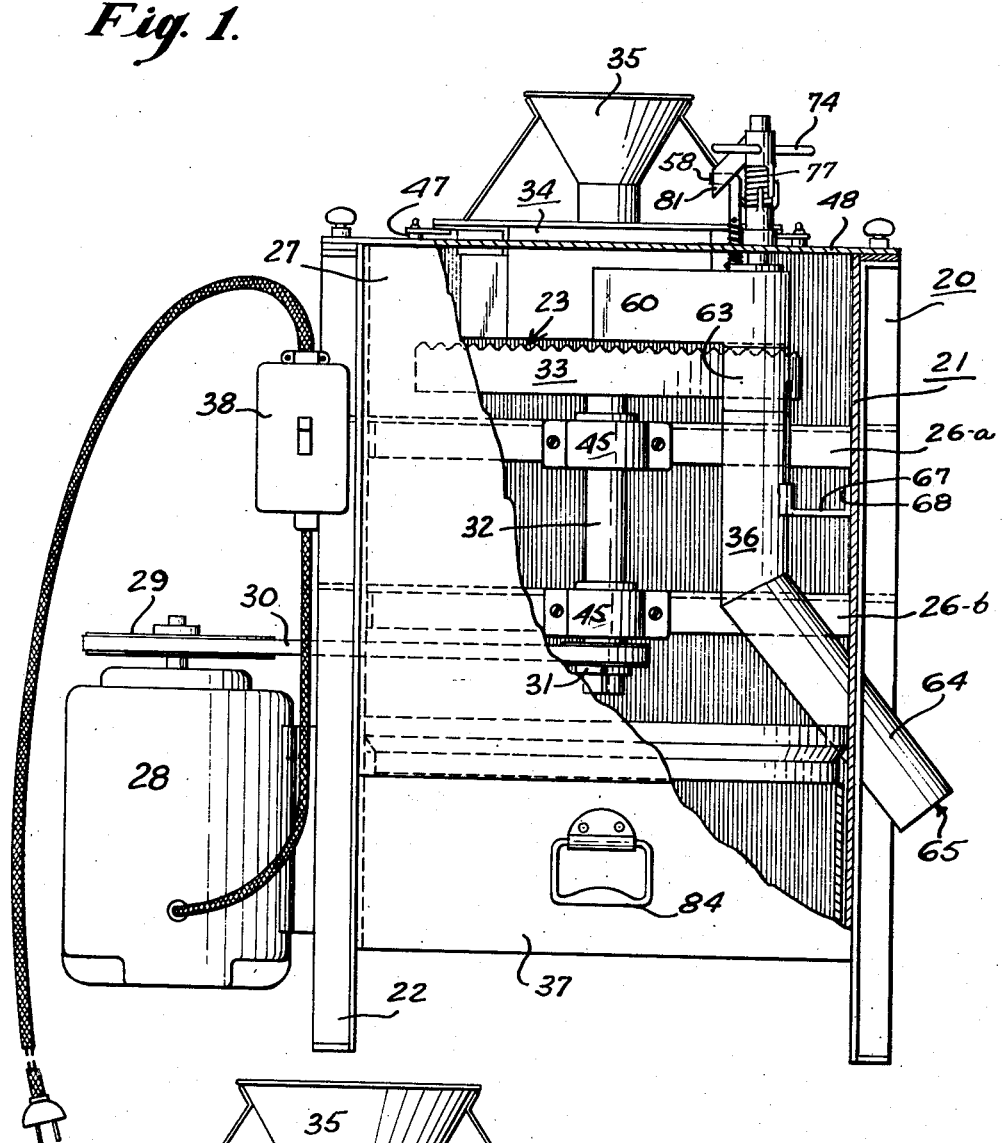

Nov. 9, 1954
W. DRUTT
2,693,833
NUT BLANCHING MACHINE
Filed June 28, 1950
4 Sheets-Sheet 3
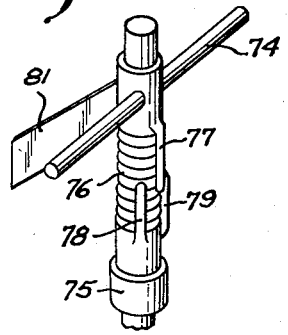
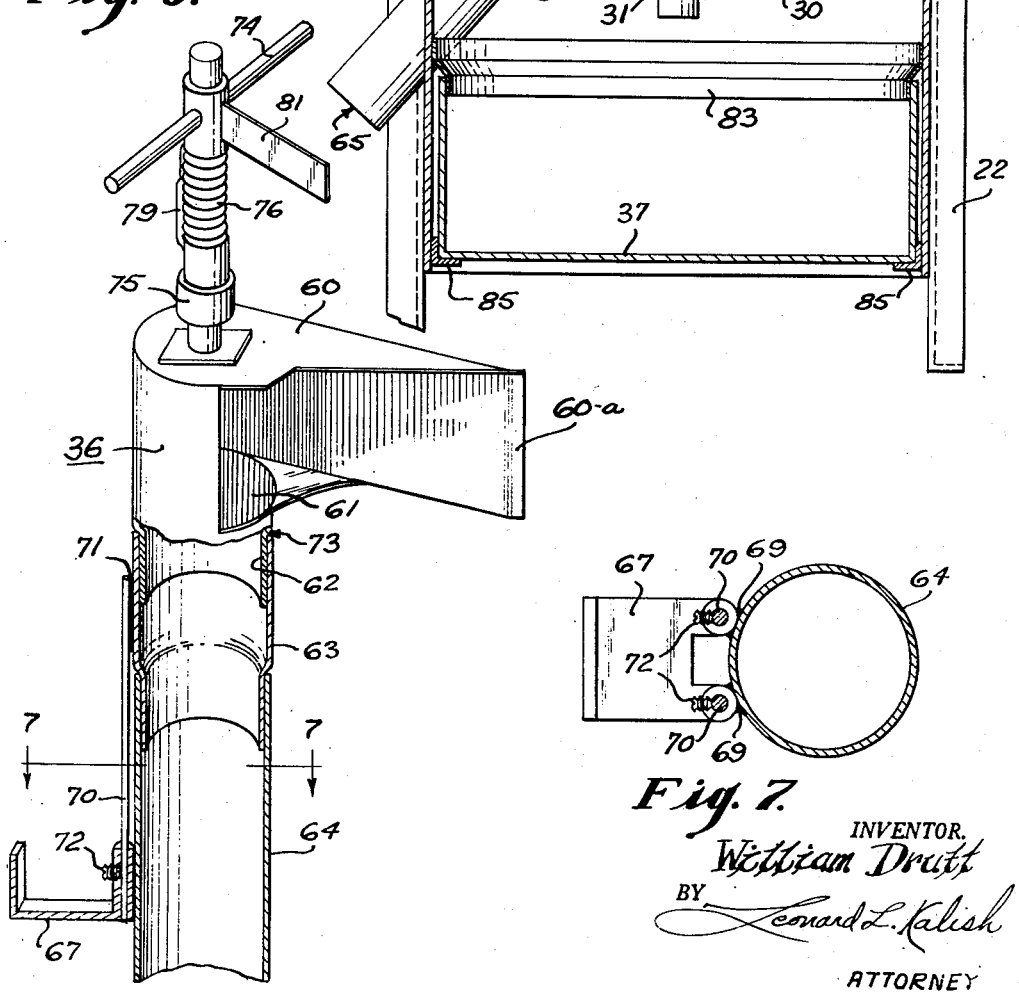

Nov. 9, 1954
W. DRUTT
2,693,833
NUT BLANCHING MACHINE
Filed June 28, 1950
4 Sheets-Sheet 4
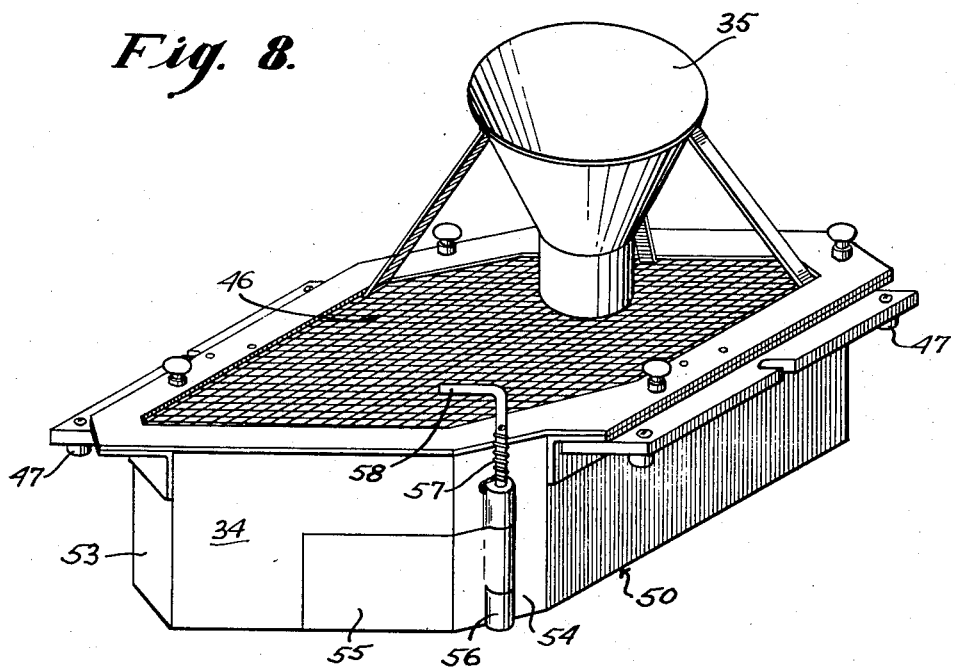
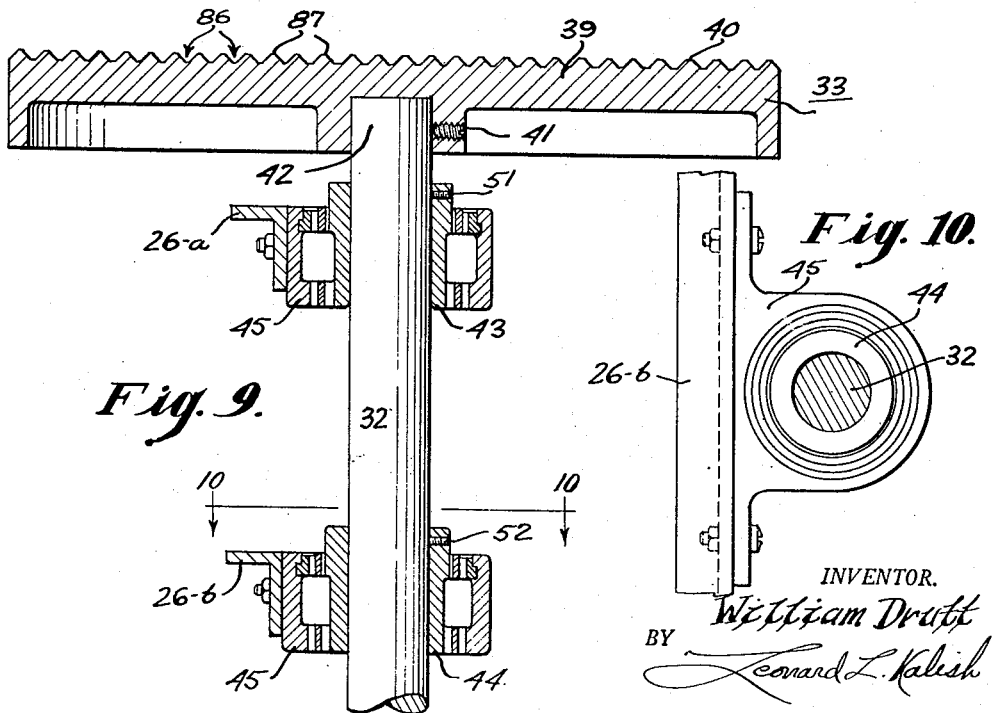
INVENTOR.
William Drutt
BY
Leonard L. Kalish
ATTORNEY 2,693,833

NUT BLANCHING MACHINE

William Drutt, Wyndmoor, Springfield Township, Montgomery County, Pa., assignor to Chunk-E-Nut Products Company of Philadelphia, Inc., Philadelphia, Pa., a corporation of Pennsylvania Application June 28, 1950, Serial No. 170,881

7 Claims. (Cl. 146—32)

The present invention relates to machines for removing the skin or shell from nuts or the like, and relates particularly to a nut blanching machine adapted to remove the membrane or shell from peanut-kernels.

An object of the present invention is to provide a nut blanching machine which separates the kernel from the shell without damaging the kernel.

Another object of the present invention is to provide a nut blanching machine wherein the kernels may be separated from the shells and easily conveyed to a storage bin or receptacle without being touched by the operator of the machine.

Another object of the present invention is to provide means for removing shells from nut-kernels in a substantially continuous operation.

Further objects will be apparent by reference to the appended specification, claims and drawings.

For the purpose of illustrating the invention, there are shown in the accompanying drawings forms thereof which are at present preferred, although it is to be understood that the various instrumentalities of which the invention consists can be variously arranged and organized and that the invention is not limited to the precise arrangements and organizations of the instrumentalities as herein shown and described.

In the drawings wherein like reference characters indicate like parts:

Figure 1 represents a front elevational view, partly in section, of the nut blanching machine of the present invention.

Figure 2 represents a top plan view of the nut blanching machine shown in Figure 1.

Figure 3 represents an enlarged fragmentary plan view, partly in section, of the kernel-removing means of the present invention.

Figure 4 represents an enlarged fragmentary vertical cross-sectional view taken generally along line 4—4 of Figure 2.

Figure 5 represents a vertical cross-sectional view taken generally along line 5—5 of Figure 2.

Figure 6 represents an enlarged perspective view, partly in section, of the kernel-removing scoop and discharge conduit.

Figure 7 represents an enlarged horizontal cross-sectional view taken generally along line 7—7 of Figure 6.

Figure 8 represents an enlarged perspective view of the nut-retaining cage of the present invention.

Figure 9 represents an enlarged vertical cross-sectional view of the rotary abrading table and support-means therefor.

Figure 10 represents a horizontal cross-sectional view taken generally along line 10—10 of Figure 9.

Figure 11 represents a vertical cross-sectional view of the modified form of rotary abrading table.

Figure 12 represents a perspective view of the rear of the scoop control-handle shown in Figure 6.

The nut blanching machine 20 of the present invention includes a body 21 comprising a rectangular frame having supporting legs 22, intervening stringers or ribs 26 and panel-members 27.

The motor 28 is supported on one side of the body 21 and connected through the pulley 29 and drive belt 30 to the pulley 31 and drive shaft 32 to the rotary abrading table 33; said rotary abrading table being mounted within the body 21 with the axis of rotation thereof vertically disposed.

A nut-retaining cage 34 is supported by the body 21 above the rotary abrading table 33 with funnel-means 35 operatively connected thereto through which to admit unblanched nuts to the cage 34. Also supported by the body 21 and operatively disposed adjacent the cage 34 is a kernel-removing scoop and conduit 36 by which the skin-free kernels may be removed from the cage 34.

Within the body 21 and beneath the rotary abrading table 33, a drawer-like hopper 37 is operatively disposed to receive the shells or skins removed during the blanching operation.

The motor 28 is electrically controlled, as through the switch 38 whereby to operate said rotary abrading table when the motor 28 is energized.

The body 21 is rigidly constructed to provide a generally rectangular box-like structure supported on the legs 22 with the panel-members 27 forming a generally hollow structure. The ribs or stringers 26 may be appropriately disposed between and secured to the legs 22 whereby to rigidify the body-member 21 and to provide supports for the mechanism contained therewithin.

The rotary abrading table 33 comprises a wheel or disc 39 having an abrading surface 40 and a set screw 41 whereby the disc 39 may be secured to the upper end 42 of the shaft 32. The shaft 32 may be supported in a plurality of combination radial-and-thrust bearings 43 and 44; said thrust-bearings supported in pillow-blocks 45 which are secured to the ribs or stringers 26-a and 26-b, as is shown in Figures 1, 5, 9 and 10. The bearings 43 and 44 may be adjustably secured to the shaft 32 whereby the scored surface 40 of the disc 39 may be moved vertically.

Thus, when the motor 28 is energized, the abrading surface 40 of the disc 39 of the rotary abrading table 33 is caused to rotate within the body 21.

Supported above the abrading surface 40, in spaced relation thereto, is the nut-receiving cage 34. The nut-receiving cage 34 is a generally rectangular bottomless container having a screen-like top 46 with a funnel-like conduit 35 through which the unblanched nuts may be admitted to the interior of the cage 34.

A plurality of spacers 47 are secured to the periphery of the cage 34, near the upper edge, and are adapted to rest against the upper surface of the top panel 48 of the body 21 when the cage 34 is supported in the opening 49, with the lower edge 50 in spaced relation to the abrading surface 40, as is shown particularly in Figure 1. The spacers 47 are of a length whereby the peripheral opening 23 between the edge 50 and the surface 40 is wide enough to permit the passage outwardly therethrough of shells or skins removed from the kernels but not wide enough to allow the passage therethrough of the kernels.

Additional adjustment of the peripheral opening 23 may be made by moving the shaft 32 vertically in the bearings 43 and 44 by adjusting the lock-screws 51 and 52.

Thus, there is provided a nut-retaining cage 34 having a rotating bottom formed by the abrading surface 40 whereby the unblanched nuts may be agitated within the cage 34 to remove the shells or skins from the kernels. To increase the blanching properties of the machine of the present invention, the nut-retaining cage 34 may have the corners thereof beveled, as at 53 and 54, whereby to prevent a quantity of nuts from becoming lodged in the corner of the cage. The constant rotary motion of the disc 39 tumbles the nuts about on the abrading surface 40 and, by centrifugal force, throws them against the sides of the cage 34 whereby to loosen the shells from the kernels. When the shells are removed from the kernels, they pass outwardly through the peripheral opening, 23 to the interior of the body 21 where they fall into the drawer-like hopper 37. The kernels may be retained within the cage 34 until all of the shells have been removed.

An inwardly swinging door 55 is pivotally secured, as at 56, to one corner 54 of the nut-retaining cage 34. A spring 57 urges the door 55 to the closed position shown in Figure 8, at all times. A handle-member 58 is secured to the door 55, through the pivot 56, whereby to swing the door 55 inwardly, to the position shown in dash-dot lines at 59 in Figure 3.

Closely adjacent the outer surface of the vertical side-wall of the nut-retaining cage 34, and surrounding the opening of the door 55, is a scoop or hopper 60 which, as is shown particularly in Figures 3, 5, and 6, forms a lateral passageway or conduit which is a continuation of the opening formed when the door 55 is moved to the position shown in dash-dot lines at 59.

The scoop 60 has an opening 61 formed in the bottom surface thereof with the tube 62 depending vertically therefrom and formed in continuation thereof.

The tube 62 is adapted to telescope within a reducing sleeve 63; said reducing sleeve 63 connected with a discharge conduit 64 which passes downwardly through the interior of the body 21, and out one side thereof to terminate, as at 65, in a position where a kernel-receiving receptacle (not shown) may be placed and into which the skin-free kernels may be discharged.

Unblanched nuts are fed into the cage 34 through the funnel 35 to the top of the rotating abrading disc 39. Within the cage they are tumbled and thrown against the side-walls of cage to loosen the shells from the kernels. The shells are small enough to pass through the peripheral opening 23 and fall into the hopper 37. The kernels remain within the cage until all the shells have been removed.

Thereafter, with the scoop 60 operatively disposed adjacent the opening of the door 55, as is shown in Figure 3 in solid lines, the door 55 may be swung open into the cage 34 and, with the table 33 rotating in the direction of the arrow 66, the kernels will be guided by the door 55 into the scoop 60, through the opening 61, and downwardly through the conduits 62, 63 and 64 and into a nut-receiving receptacle (not shown) at the discharge end 65 of the conduit 64.

The conduit 64 may be supported within the body 21 by a bracket 67 which may be bolted or welded or otherwise secured, as at 68, to the inner surface of one of the panels 27. The pipe 64 may be secured, as by welding, to the bracket 67, as at 69.

The reducing sleeve 63 is telescopically and adjustably supported at the top of the conduit 64 by one or more rods 70 which may be brazed or welded at one end to the sleeve 63, as at 71. The other end of the rods 70 may be adjustably supported in the bracket 67, as is shown particularly in Figures 1, 5, 6, and 7. The reducing sleeve 63 may be raised or lowered by adjusting the set screws 72 against the rods 70. The shoulder 73 of the tube 62 rests on the upper end of the sleeve 63 and is rotatably supported thereby. Thus, the scoop 60 may be pivoted or rotated on the shoulder 73, to bring the outer end 60–a thereof above the abrading surface 40 of the disc 39 and into position against the vertical wall of the nut-retaining cage 34 around the opening of the door 55.

By adjusting the vertical position of the upper edge of the sleeve 63, the scoop 60 may be positioned slightly above the rotating abrading surface 40 so that the disc may pass freely beneath the scoop 60, while yet insuring that the scoop 60 will cover the opening when the door 55 is swung inwardly, thus guiding all of the kernels through the doorway and into the scoop 60 and through the conduits 62, 63 and 64.

A shaft and collar 75 are secured to the top of the scoop 60, with the collar supported in the top panel 49. A handle 74 is connected to the collar 75 through a lost-motion linkage which includes the spring 76. A boss 77 on the handle 74 is adapted to engage stop-members 78 and 79 secured to the collar 75.

Thus, when the handle 74 is turned counter-clockwise (to the position shown in dash-dot lines at 24 in Figure 3) the boss 77 strikes the stop-member 79 and moves the scoop 60 to the position shown in the dash-dot lines at 80, and the nut-retaining cage 34 may be moved into operating position through the opening 49, without striking the scoop 60. Thereafter, the handle 74 may be turned clockwise (Figure 3), and the scoop 60 is moved into position above the disc 39 and against the side of the cage 34 adjacent the door 55. In this position of the handle 74, a finger 81 secured thereto contacts the lever 58 secured to the closed door 55, as is shown particularly in Figure 3.

When it is desired to open the door 55, the handle 74 is turned still farther in a clockwise direction to the position shown in dash-dot lines at 82. This forces the finger 81 against the end of the lever 58, swinging the door 55 to the open position shown in dot-dash lines at 59. When all of the kernels have been guided by the door 55 from the cage 34 into the scoop 60, the handle 74 may be released and the springs 57 and 76 will return the door 55 to the closed position and move the handle 74 back to the position shown in solid lines in Figure 3.

As the shells or skins pass outwardly through the opening 23 they fall downwardly through the body 21 and are directed by the flanges 83 into the drawer-like hopper 37. When the hopper 37 becomes filled with shells, it may be pulled outwardly by the handle 84 on the skids 85, and carried to a point of disposal of the husks. Thereafter, the empty drawer may be returned to shell-receiving position sliding it inwardly on the skids 85.

The blanching of the nuts is accomplished by tumbling the unblanched nuts about on the abrading surface 40 of the rotating disc 39, and forcing the nuts against the vertical surfaces of the multi-sided nut-retaining cage 34. This tumbling action sufficiently agitates the nuts to remove the shells but yet does not divide or otherwise harm the kernels.

As is shown particularly in Figures 1, 3, 5 and 9, the disc 39 may be a cast metal wheel with serrations or scoring of the upper surface 40 formed therein by machining a plurality of grooves 86 into the upper surface thereof to provide a great number of abrading points or bosses 87.

In lieu of the serrated disc 39, a disc 88 having a smooth upper surface with a screen-like nut-contacting member 89 held slightly above and in spaced relation thereto by the supports 90. This construction is shown particularly in Figure 11.

In the modified form of disc shown in Figure 11, the nuts are tumbled about on top of the screen 89 and the shells fall through the screen to the space between the disc 88 and the screen 89 and are thrown outwardly by centrifugal force of the rotating disc 88, to fall within the hopper 37. The kernels will remain on top of the screen 89 and may be removed therefrom by the opened door 55 and the scoop 60, as described hereinabove. The use of the disc 88 facilitates the removal of the shells or skins from the interior of the cage 34.

The present invention may be embodied in other specific forms without departing from the spirit or essential attributes thereof, and it is therefore desired that the present embodiments be considered in all respects as illustrative and not restrictive, reference being had to the appended claims rather than to the foregoing description to indicate the scope of the invention.

Having described the invention, what I claim as new, and desire to protect by Letters Patent, is the following:

1. In a nut-blanching machine, a rotatable nut-supporting disc having an abrading upper surface, a multi-sided bottomless nut-retaining cage having its lower edge supported above and in spaced relation to said rotatable disc with a peripheral aperture therebetween, a pivotable door and a doorway in one side of said cage, said door spring-urged to closed position and being adapted to swing inwardly above said disc, a rotatable and vertically adjustable nut-guiding scoop and conduit movably supported adjacent said doorway, control-means on said scoop to move said scoop to and fro above said disc and into contact with said cage, and a finger on said control-means whereby to engage and to open said door against said spring-action when said scoop is in nut-receiving position adjacent said doorway.

2. In a nut-blanching machine, a rotatable disc having an upper abrading surface, a bottomless multi-sided nut-retaining cage supported above said disc, a peripheral aperture between said disc and the lower edge of said cage, a door and a doorway in one side of said cage, said door being adapted to be pivoted inwardly to guide nut-kernels through said doorway, a spring urging said door to closed position at all times, a scoop movably supported adjacent said doorway and adapted to form a passageway in continuation thereof, said scoop being rotatable and vertically adjustable, control means to operate said scoop and to open said door successively, said door being operable independently of said scoop, and a container beneath said disc to receive the shells which pass from said cage through said peripheral aperture.

3. In a nut-blanching machine, a housing, a nut-abrading surface within said housing, a multi-sided nut-retaining cage supported by said housing above said abrading surface, a kernel conveyer and a shell-removing means, said abrading surface including a horizontally disposed rotatable disc the top surface of which has a high coefficient of friction, a vertically disposed shaft supported in bearings secured to said housing and mounting said disc and being axially adjustable in said bearings to vary the height of said disc, power-means operatively connected to said shaft for rotating said disc, said nut-retaining cage comprising a bottomless receptacle having a side-wall and having a top provided with an opening through which unblanched nuts may be admitted to the interior of said cage and supplied to said abrading surface, said side-wall having its bottom edge spaced above said abrading surface and having an aperture for discharge of nut-kernels therethrough, a door in said aperture and a spring constantly urging said door to closed position, said kernel conveyer including a scoop pivotally supported exteriorly of the cage for movement into communicating relation with said aperture, and a vertically adjustable conduit connected to and supporting said scoop for conveying kernels from said housing, said shell-removing means comprising a container disposed beneath said abrading means and said cage in said housing into which nut-shells can fall, and said container being removable from said housing.

4. In a nut-blanching machine, a housing, a nut-abrading surface within said housing, a multi-sided nut-retaining cage supported by said housing above said abrading surface, a kernel conveyer and a shell-removing means, said abrading surface including a horizontally disposed rotatable disc the top surface of which has a high coefficient of friction, a vertically disposed shaft supported in bearings secured to said housing and mounting said disc and being axially adjustable in said bearings to vary the height of said disc, power-means operatively connected to said shaft for rotating said disc, said nut-retaining cage comprising a bottomless receptacle having a side-wall and having a top provided with an opening through which unblanched nuts may be admitted to the interior of said cage and supplied to said abrading surface, said side-wall having its bottom edge spaced above said abrading surface and having an aperture for discharge of nut-kernels therethrough, a door normally closing said aperture, said kernel conveyer including a scoop pivotally supported exteriorly of the cage and means both for moving said scoop into communicating relation with said aperture and for swinging said door into said cage for deflecting nut-kernels into said scoop, and a vertically adjustable conduit connected to and supporting said scoop for conveying kernels from said housing, said shell-removing means comprising a container disposed beneath said abrading means and said cage in said housing into which nut-shells can fall, and said container being removable from said housing.

5. In a nut-blanching machine, a housing, a vertically adjustable nut-abrading surface within said housing, a multi-sided nut-retaining cage supported by said housing above said abrading surface, said abrading surface including a horizontally disposed rotatable disc the top surface of which has a high coefficient of friction, a vertically disposed shaft mounting said disc, power-means operatively connected to said shaft for rotating said disc, said nut-retaining cage comprising a bottomless receptacle having a side-wall and having a top provided with an opening through which unblanched nuts may be admitted to the interior of said cage and supplied to said abrading surface, said side-wall having its bottom edge spaced above said abrading surface and having an aperture for discharge of nut-kernels therethrough, and a kernel conveyer including a scoop movably supported exteriorly of the cage, means for moving said scoop into communicating relation with said aperture.

6. In a nut-blanching machine, a housing, a vertically adjustable nut-abrading surface within said housing, a multi-sided nut-retaining cage supported by said housing above said abrading surface, said abrading surface including a horizontally disposed rotatable disc the top surface of which has a high coefficient of friction, a vertically disposed shaft mounting said disc, power-means operatively connected to said shaft for rotating said disc, said nut-retaining cage comprising a bottomless receptacle having a side-wall and having a top provided with an opening through which unblanched nuts may be admitted to the interior of said cage and supplied to said abrading surface, said side-wall having its bottom edge spaced above said abrading surface and having an aperture for discharge of nut-kernels therethrough, a door normally closing said aperture, a kernel conveyer including a scoop movably supported exteriorly of the cage upon a vertically adjustable conduit, and means for successively moving said scoop into communicating relation with said aperture and for swinging said door into said cage for deflecting nut-kernels into said scoop and thereby conveying kernels from said housing through said scoop and said conduit.

7. In a nut-blanching machine, a housing, a vertically adjustable nut-abrading surface within said housing, a multi-sided nut-retaining cage supported by said housing above said abrading surface, said abrading surface including a horizontally disposed rotatable disc the top surface of which has a high coefficient of friction, a vertically disposed shaft mounting said disc, power-means operatively connected to said shaft for rotating said disc, said nut-retaining cage comprising a bottomless receptacle having a side-wall and having a top provided with an opening through which unblanched nuts may be admitted to the interior of said cage and supplied to said abrading surface, said side-wall having its bottom edge spaced above said abrading surface and having an aperture for discharge of nut-kernels therethrough, a door normally closing said aperture, a kernel conveyer including a scoop pivotally supported exteriorly of the cage upon a vertically adjustable conduit for movement into communicating relation with said aperture, and means responsive to said movement of the scoop for swinging said door into said cage for deflecting nut-kernels into said scoop and conduit and thereby conveying kernels from said housing.

References Cited in the file of this patent

UNITED STATES PATENTS

| Number | Name | Date |
|---|---|---|
| 850,424 | Franklin et al. | Apr. 16, 1907 |
| 860,349 | Brenizer | July 16, 1907 |
| 877,550 | Clark | Jan. 28, 1908 |
| 1,476,221 | Roylance | Dec. 4, 1923 |
| 1,679,557 | Bailey | Aug. 7, 1928 |
| 1,979,384 | Harbaugh | Nov. 6, 1934 |

FOREIGN PATENTS

| Number | Country | Date |
|---|---|---|
| 579,908 | Great Britain | Apr. 12, 1945 |